Patented June 30, 1936

2,045,906

UNITED STATES PATENT OFFICE 2,045,906

COATING COMPOSITION

Earl W. Gardner, Harry Roden, and Dudley H. Felder, Port Neches, Tex., assignors to The Texas Company, New York, N. Y., a corporation of Delaware No Drawing. Application January 30, 1934, Serial No. 708,964

5 Claims. (Cl. 106—31)

This invention relates to a coating composition particularly useful for coating materials which are to be subjected to severe physical stresses, for example, underground pipe lines, cables, and the like.

A product for this purpose should have a liquid or semi-liquid consistency at elevated temperatures but should have a relatively high melting point and a low penetration even at elevated temperatures. Furthermore, there should be no tendency to flow at ordinary temperatures and after application the material should be sufficiently hard to resist soil stresses and the roots of trees, shrubs, or other vegetation at any normal temperatures. While the material must be sufficiently hard to resist outside forces, it must also be adhesive, tough and have sufficient pliability to be resistant to shock, in other words, it must not be brittle.

A product, meeting the above conditions, is provided in accordance with the present invention. The preferred coating material is formed of from 50% to 75% of an asphalt base and from 25% to 50% of a mineral filler, such as clay-like materials of the type of fuller's earth, bentonite, infusorial earth, powdered contact clay, or finely ground silica, talc or slate, and the like, or a combination of these fillers, referred to herein as inert mineral fillers.

The preparation of a suitable asphalt base is essential in that the base is required to bond the particles of the filler together to avoid disintegration of the coating. The asphalt base may be formed of 50% to 95% of reduced cycle asphalt, the remainder being uncracked petroleum asphalt, air blown or otherwise reduced to the desired melting point and penetration. It is preferred to use from 75% to 85% of cycle asphalt in the base but this proportion is not essential.

The cycle asphalt referred to herein is the residue from the usual cracking operation charged with distillate oils, such as pressure gas oil. The pressure tar produced from the cracking operations may be reduced with steam, or air blowing, or both, to a cycle asphalt of approximately the proper melting point and penetration, a melting point (ball and ring) of about 193° F. being preferred.

The uncracked asphalt, referred to herein, is an uncracked petroleum residuum, reduced in atmospheric or vacuum stills to about 600° F. flash. Distillates of gasoline, kerosene, pressure gas oil and lubricating distillate are removed overhead, the residuum being transferred to a converter where it is air blown and/or steam reduced at a maximum temperature of about 500° F. to an asphalt of 185° to 200° F. melting point and a penetration at 77° F. (A.S.T.M.) of from 25 to 35.

The cycle asphalt and uncracked asphalt are preferably reduced separately to a melting point, such that the blended materials will have the desired degree of hardness. The inert mineral filler is then added to the base in the proportion of approximately 10% to 50% of the final product and the materials are mixed to a uniform consistency ready for application to underground pipes, or the like. From 30% to 45% of the filler is preferred. The filler is preferably in the form of a fine powder, a material screened through 200 mesh screen being preferred for the purpose.

The product produced in accordance with the above disclosure has been found to be sufficiently hard to be resistant to soil stresses and yet to have the requisite toughness and adhesiveness to prevent it from being shattered and broken from the coated surface in use. The following is a typical example of the tests run on the coating material herein described:

| | |
|---|---|
| Asphalt base | 60% |
|   Cycle asphalt | 85% |
|   Petroleum asphalt uncracked | 15% |
| Inert mineral filler | 40% |
| Melting point (°F., B. & R.) | 193 |
| Ductility at 77° F. | 0 |
| Penetration at 77° F. | 2 |
| Penetration at 32° F. | 2 |
| Penetration at 115° F. | 6 |

Obviously, many modifications and variations of the invention, as hereinbefore set forth, may be made without departing from the spirit and scope thereof, and therefore only such limitations should be imposed as are indicated in the appended claims.

We claim:

1. A coating composition consisting of a major proportion of cycle asphalt, a lesser proportion of substantially uncracked petroleum asphalt and from 10% to 50% of a finely divided mineral filler.

2. A coating composition formed of an asphalt base comprising 70% to 95% cycle asphalt and 5% to 30% of uncracked petroleum asphalt and embodying a finely divided mineral filler.

3. A coating composition comprising an asphalt base and an inert mineral filler, said asphalt base embodying pressure tar produced as a residuum from cracking operations charged with distillate oil and uncracked petroleum residuum, said pressure tar and petroleum residuum being separately reduced to high melting point products.

4. A coating composition comprising an asphalt base and a mineral filler, said asphalt base embodying reduced pressure tar, produced as a residuum from cracking operations charged with distillate oil, and uncracked petroleum residuum air blown to a relatively low penetration and high melting point.

5. A coating composition formed of approximately 60% of an asphalt base and 40% of a filler selected from the group consisting of fuller's earth, silica and talc, said asphalt base comprising approximately 85% cycle asphalt and 15% uncracked petroleum asphalt.

EARL W. GARDNER.
HARRY RODEN.
DUDLEY H. FELDER.